United States Patent
Kageyama et al.

(10) Patent No.: US 11,364,576 B1
(45) Date of Patent: Jun. 21, 2022

(54) LASER MACHINING APPARATUS

(71) Applicant: Yamazaki Mazak Corporation, Niwa-gun (JP)

(72) Inventors: Keisuke Kageyama, Niwa-gun (JP); Kazuya Shimamoto, Niwa-gun (JP); Keita Hachiya, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 17/347,597

(22) Filed: Jun. 15, 2021

(30) Foreign Application Priority Data

Feb. 26, 2021 (JP) .............................. JP2021-029401

(51) Int. Cl.
*B23K 37/04* (2006.01)
*B23K 26/08* (2014.01)

(52) U.S. Cl.
CPC ............ *B23K 37/04* (2013.01); *B23K 26/083* (2013.01); *B23K 26/0823* (2013.01); *B23K 26/0869* (2013.01)

(58) Field of Classification Search
CPC ............ B23K 37/0538; B23K 26/0823; B23K 37/047; B23K 26/0846; B23K 2101/28; B23K 2101/04
USPC ............. 219/121.67, 121.72, 121.78, 121.82
See application file for complete search history.

(56) References Cited

U.S. PATENT DOCUMENTS

| | | | | |
|---|---|---|---|---|
| 2004/0164062 A1* | 8/2004 | Horisberger | ....... | B23K 26/1488 219/121.82 |
| 2008/0202299 A1* | 8/2008 | Kudrus | .................... | B26D 3/16 83/37 |
| 2008/0302769 A1* | 12/2008 | Yamazaki | .......... | B23K 37/0538 219/121.67 |

(Continued)

FOREIGN PATENT DOCUMENTS

| | | | |
|---|---|---|---|
| JP | 56-100288 U | 8/1981 | |
| JP | 02-016291 U1 * | 2/1990 | ............. B23K 26/10 |

(Continued)

OTHER PUBLICATIONS

Submission of Certification of Exceptions to Lack of Novelty of Invention filed in corresponding JP Application No. 2021-029401, Feb. 26, 2021, w/ Certification of Translation of the same, enclosing Certification to Receive Application of the Provisions of Exception to Lack of Novelty of Invention.

(Continued)

*Primary Examiner* — Thien S Tran
(74) *Attorney, Agent, or Firm* — Mori & Ward, LLP

(57) ABSTRACT

A laser machining apparatus includes a chuck configured to hold a workpiece such that the workpiece is rotatable about a rotational axis, a first workpiece support provided on a first side with respect to the chuck in an axial direction along the rotational axis and configured to support a projected workpiece projecting from the chuck on the first side, and a parts catcher configured to receive a product when the projected workpiece is not supported by the first workpiece support and convey the product to a loading dock. The parts catcher (Continued)

includes a first catcher workpiece support configured to support the projected workpiece. In the axial direction, a first distance between the first catcher workpiece support and the chuck is shorter than a second distance between the first workpiece support and the chuck.

21 Claims, 14 Drawing Sheets

(56) References Cited

U.S. PATENT DOCUMENTS

| | | | | |
|---|---|---|---|---|
| 2013/0020295 A1* | 1/2013 | Schopf | ............... | B23K 37/04 |
| | | | | 219/121.72 |
| 2016/0074961 A1* | 3/2016 | Schindhelm | ....... | B23K 26/1462 |
| | | | | 219/121.83 |

FOREIGN PATENT DOCUMENTS

| JP | H058065 A * | 1/1993 | ............ B23K 26/00 |
|---|---|---|---|
| JP | 2008-302375 | 12/2008 | |
| JP | 6741447 B2 | 9/2017 | |
| JP | 6741447 B2 * | 8/2020 | ............ B23K 26/10 |

OTHER PUBLICATIONS

Japanese Office Action for corresponding JP Application No. 2021-029401, dated Feb. 8, 2022.

* cited by examiner

LASER MACHINING APPARATUS

CROSS-REFERENCE TO RELATED APPLICATIONS

The present application claims priority under 35 U. S. C. § 119 to Japanese Patent Application No. 2021-029401, filed Feb. 26, 2021. The contents of this application are incorporated herein by reference in its entirety.

BACKGROUND

Technical Field

The present specification relates to a laser machining apparatus.

Background Art

Japanese Patent No. 6,741,447 describes a laser machining apparatus including a workpiece shooter. The workpiece shooter is movable between a laser machining position and a standby position, and moves to the laser machining position to receive a short product to be laser-machined when a short workpiece is machined.

SUMMARY OF THE INVENTION

According to one aspect of the present disclosure, a laser machining apparatus includes a chuck, a first workpiece support, a laser machining head, and a parts catcher. The chuck is configured to hold a workpiece such that the workpiece is rotatable about a rotational axis. The first workpiece support is provided on a first side with respect to the chuck in an axial direction along the rotational axis, and is configured to support a projected workpiece which is a workpiece protruding from the chuck on the first side. The laser machining head is provided on the first side and is configured to machine the projected workpiece with laser beam to manufacture a product. The parts catcher is configured to receive the product when the projected workpiece is not supported by the first workpiece support and convey the product to the loading dock. The parts catcher includes a first catcher workpiece support configured to support the projected workpiece. In the axial direction, a first distance between the first catcher workpiece support and the chuck is shorter than a second distance between the first workpiece support and the chuck.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
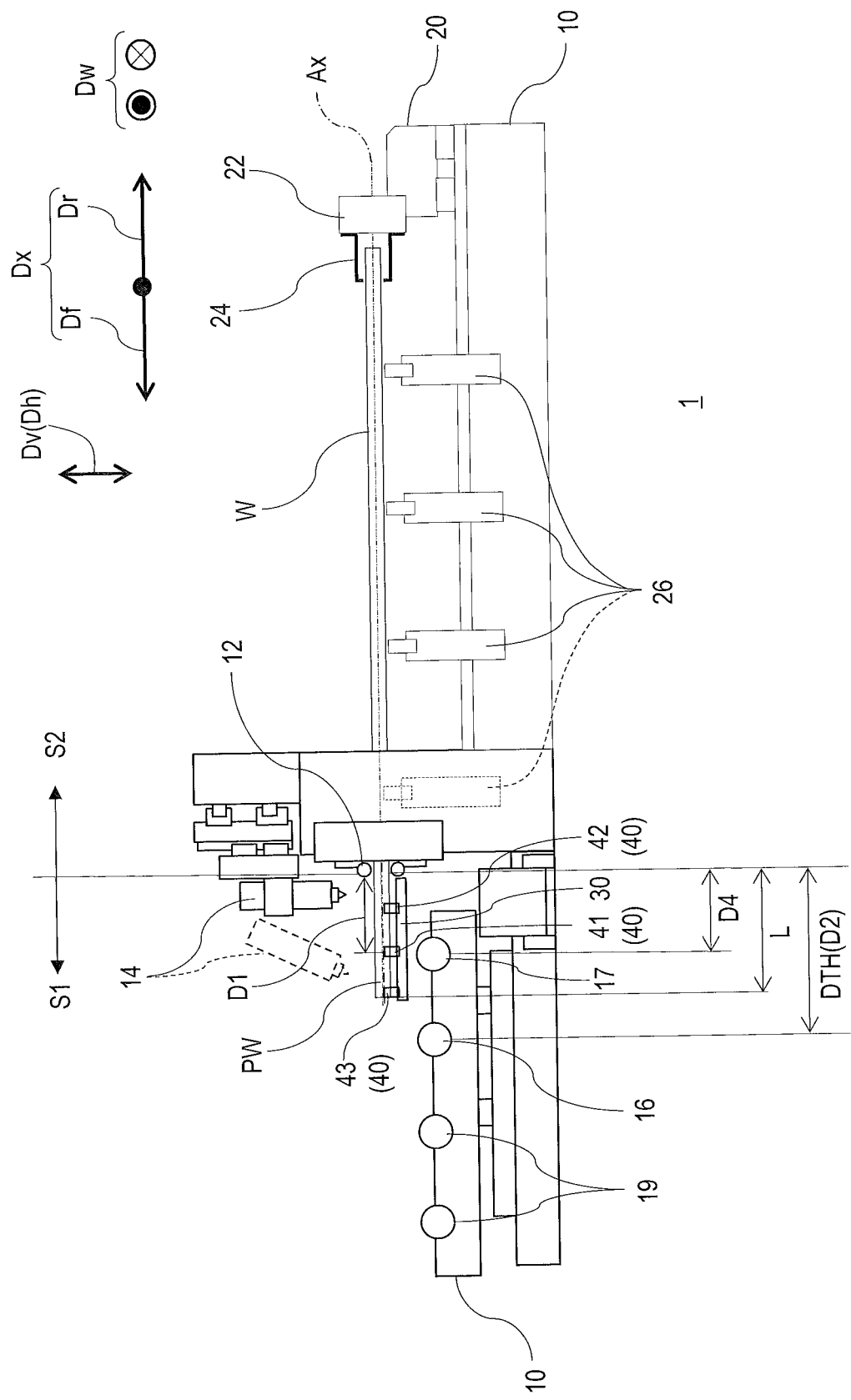
FIG. 1 is an external configuration of a laser machining apparatus according to an embodiment.

The embodiment(s) will now be described with reference to the accompanying drawings, wherein like reference numerals designate corresponding or identical elements throughout the various drawings.

Hereinafter, the present invention will be described in detail with reference to the drawings showing embodiments thereof. In the drawings, the same reference numerals denote corresponding or substantially identical components.

Embodiment

<Configuration of Laser Processing Machine 1>

FIG. 1 shows an external configuration diagram of a laser machining apparatus 1 according to an embodiment of the present invention. The laser machining apparatus 1 includes a bed 10, a chuck 12, a laser machining head 14, a first workpiece support 16, a second workpiece support 17, an additional workpiece support 19, a headstock 20, a spindle 22, an additional chuck 24, a steady rest 26, and a parts catcher 30. The chuck 12 is configured to hold the workpiece W such that the workpiece W is rotatable about the rotational axis Ax. The workpiece W is also held by an additional chuck 24 provided on the spindle 22. One end of the workpiece W is attached to the spindle 22 via the additional chuck 24, and the spindle 22 is configured to rotate around the rotational axis Ax together with the workpiece W. That is, the additional chuck 24 is configured to rotate around the rotational axis Ax together with the spindle 22. The headstock 20 supports a spindle 22 rotatably around a rotational axis Ax. The headstock 20 is provided at one end of the bed 10. The headstock 20 is movable in the axial direction Dx along the rotational axis Ax by being guided by a rail (not shown) provided on the bed 10. The spindle 22 and the additional chuck 24 are movable in the axial direction Dx together with the headstock 20. The steady rest 26 is configured to rotatably support the workpiece W around the rotational axis Ax between the chuck 12 and the additional chuck 24 in the axial direction Dx. The headstock 20, spindle 22, additional chuck 24 and steady rest 26 are provided on a second side S2 that is opposite to a first side S1 shown with respect to the chuck 12. The laser machining apparatus 1 may not include the steady rest 26.

The workpiece W is held by the chuck 12 so as to pass through the chuck 12. The workpiece W is pushed out from the chuck 12 in the forward direction Df by the headstock 20 moving in the forward direction Df from the headstock 20 toward the chuck 12 in the axial direction Dx. As the workpiece W is rotated by the spindle 22, the machining surface of the projected workpiece PW projecting from the chuck 12 is directed toward the laser machining head 14. The laser machining head 14 is provided on a first side S1 with respect to the chuck 12 in the axial direction Dx, and is configured to machine a projected workpiece PW with laser beam to produce a product. As shown by dotted line in FIG. 1, the laser machining head 14 can be oriented to a direction inclined from the vertical direction Dv toward the axial direction Dx. Note that the vertical direction Dv refers to a direction of gravity or a bilateral direction opposite thereto. The vertical direction Dv substantially coincides with a height direction Dh along the height of the laser machining apparatus 1. FIG. 1 illustrates an example in which the laser machining head 14 is oriented to a direction inclined from the vertical direction Dv to the forward direction Df, but the laser machining head 14 may be oriented to a direction inclined from the vertical direction Dv to the rearward direction Dr opposite to the forward direction Df. The laser machining head 14 may be orientable to a direction inclined from the vertical direction Dv toward the width direction Dw perpendicular to both the axial direction Dx and the vertical direction Dv.

The first workpiece support 16 and the second workpiece support 17 are provided on the first side S1 described above. The first workpiece support 16 is configured to support the projected workpiece PW in a case where the length L in the axial direction Dx of the projected workpiece PW projecting from the chuck 12 on the first side S1 is longer than the distance (threshold distance DTH) in the axial direction Dx between the first workpiece support 16 and the chuck 12. In the following embodiments, the threshold distance DTH may be referred to as a second distance D2. The second workpiece support 17 is provided between the first workpiece support 16 and the chuck 12 in the axial direction Dx. The second workpiece support 17 is configured to support the projected workpiece PW on the first side S1. The first workpiece support 16 and the second workpiece support 17 are preferably rollers. The first workpiece support 16 and the second workpiece support 17 can rotate counterclockwise in FIG. 1 to discharge the product processed by the laser machining head 14 in the forward direction Df. The laser machining apparatus 1 may further include an additional workpiece support 19 for supporting the long projected workpiece PW. The additional workpiece support 19 is also preferably a roller for convenience of discharge of the projected workpiece PW. However, the first workpiece support 16, the second workpiece support 17, and the additional workpiece support 19 may be plate-shaped members.

Figure 2:
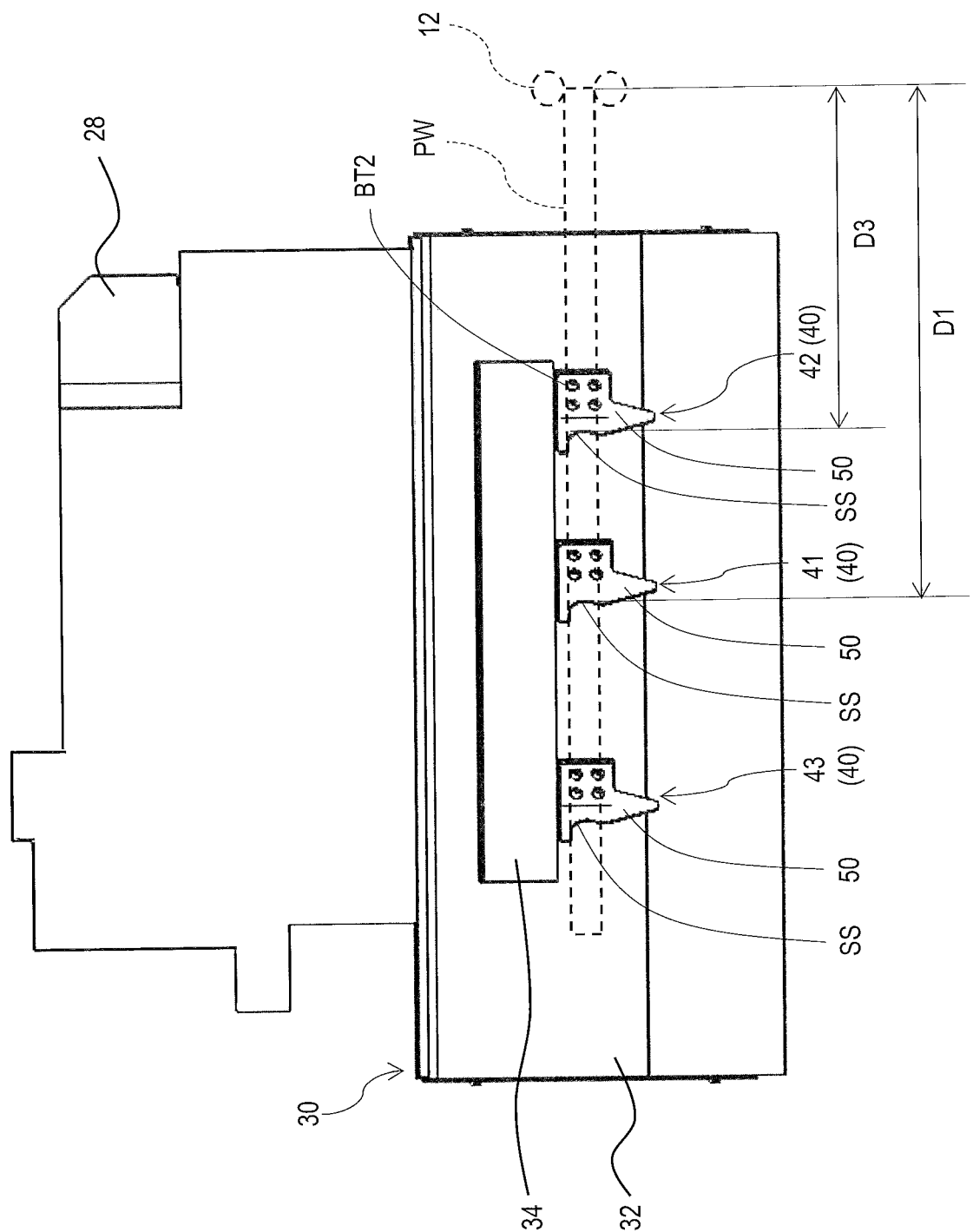
FIG. 2 is a top view of the parts catcher when the parts catcher is in the machining position.
Figure 3:
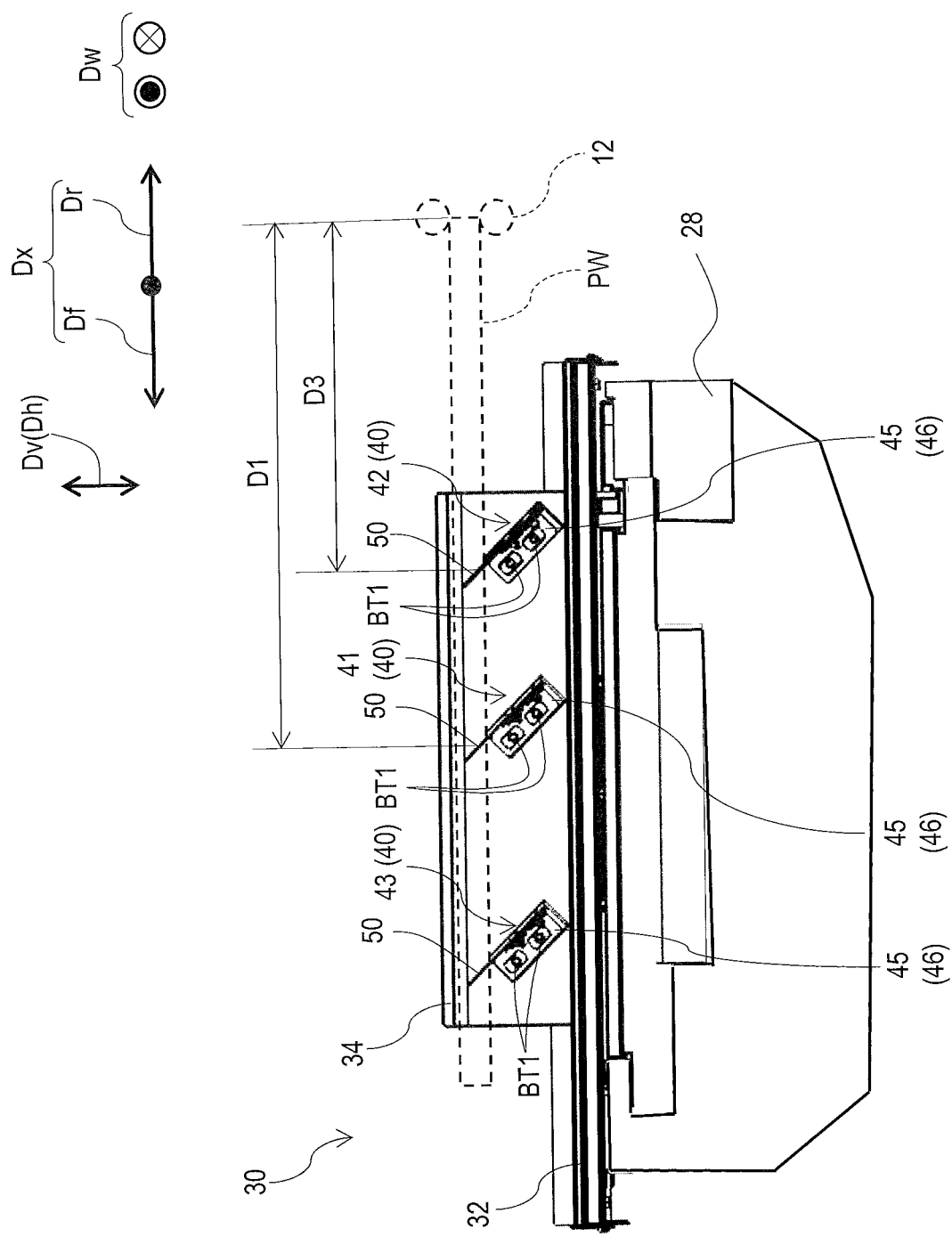
FIG. 3 is a front view of the parts catcher when the parts catcher is in the machining position.
Figure 4:
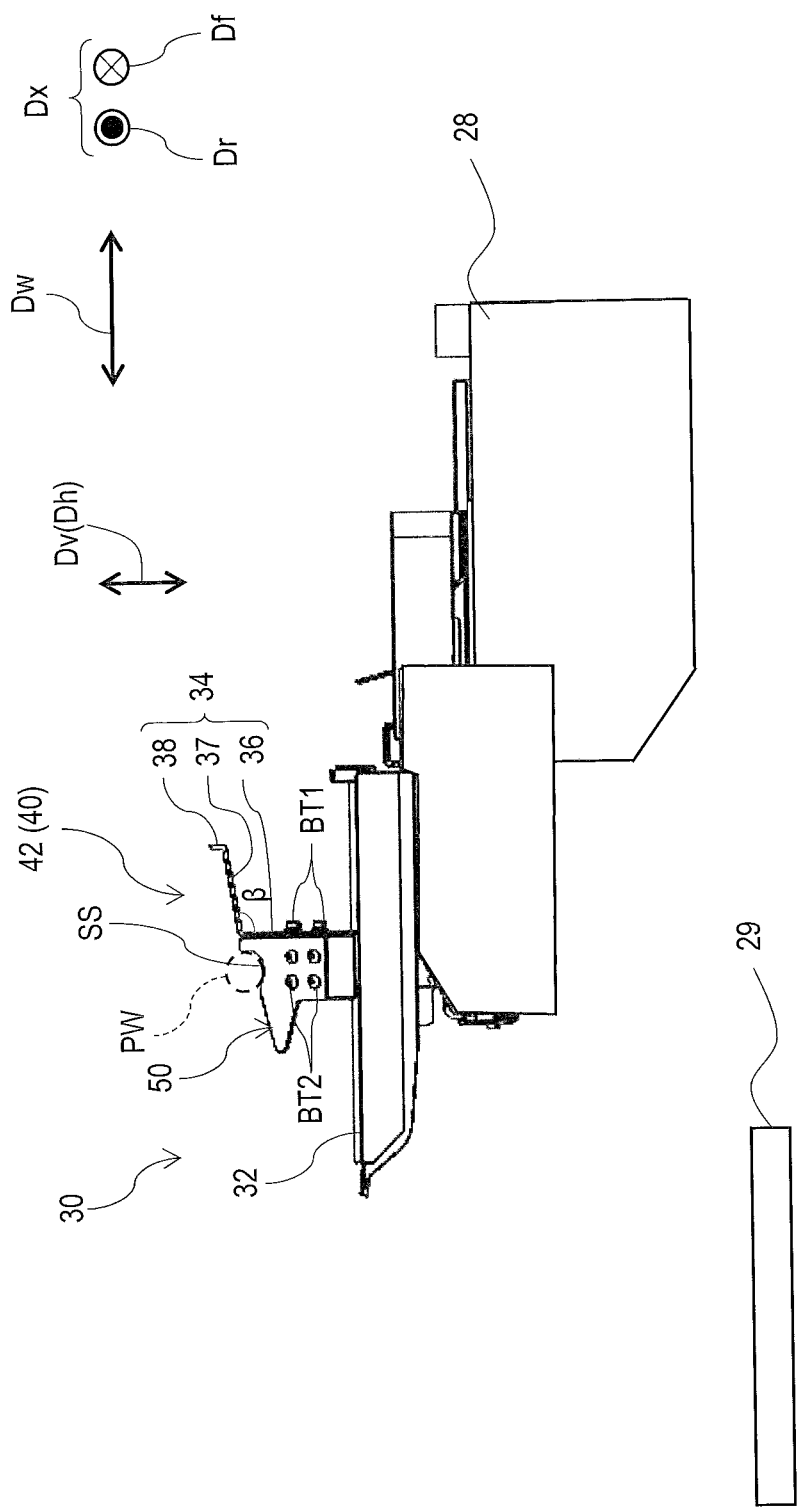
FIG. 4 is a right-side view of the parts catcher when the parts catcher is in the machining position.

The parts catcher 30 is configured to receive the product in a case where the projected workpiece PW is not supported by the first workpiece support 16. The parts catcher 30 is movable to a standby position, a machining position, and a discharge position. FIGS. 2 to 4 are a top view, a front view, and a right-side view of the parts catcher 30 when the parts catcher 30 is in the machining position, respectively. FIG. 1 also shows the parts catcher 30 located at the machining position. In FIGS. 2 to 4, the projected workpiece PW and the chuck 12 are indicated by dotted lines. FIG. 4 is a side view of the parts catcher 30 when viewed from the chuck 12 in the forward direction Df.

Referring to FIGS. 1 to 4, the parts catcher 30 includes a first catcher workpiece support 41 and a second catcher workpiece support 42 configured to support the projected workpiece PW. The second catcher workpiece support 42 is provided between the first catcher workpiece support 41 and the chuck 12 in the axial direction Dx. Further, the parts catcher 30 may include a third catcher workpiece support 43 configured to support the elongated projected workpiece PW. In FIGS. 2 to 4, the projected workpiece PW is supported by a first catcher workpiece support 41, a second catcher workpiece support 42, and a third catcher workpiece support 43. Thus, when the parts catcher 30 moves to the machining position, the projected workpiece PW is supported by the first catcher workpiece support 41.

As shown in FIG. 1, a first distance D1 between the first catcher workpiece support 41 and the chuck 12 in the axial direction Dx is shorter than a second distance D2 between the first workpiece support 16 and the chuck 12 in the axial direction Dx. Thus, a short member (a projected workpiece PW) that cannot be supported by the first workpiece support 16 can be supported by the first catcher workpiece support 41. Referring to FIGS. 1 to 3, a third distance D3 between the second catcher workpiece support 42 and the chuck 12 in the axial direction Dx is shorter than a fourth distance D4 between the second workpiece support 17 and the chuck 12 in the axial direction Dx. Thus, a short member (the projected workpiece PW) that cannot be supported by the second workpiece support 17 can be supported by the second catcher workpiece support 42. The first catcher workpiece support 41, the second catcher workpiece support 42, and the third catcher workpiece support 43 have the same configuration. The first catcher workpiece support 41, the second catcher workpiece support 42, and the third catcher workpiece support 43 are collectively referred to as a catcher workpiece support 40.

Referring to FIGS. 2 to 4, the parts catcher 30 is connected to the catcher driving unit 28. As shown in FIG. 4, the catcher driving unit 28 can drive the parts catcher 30 in a width direction Dw. By being driven by the catcher driving unit 28, the parts catcher 30 moves to any one of the standby position, the machining position, and the discharge position. The catcher driving unit 28 drives the parts catcher 30 by an actuator such as a rack and pinion or a hydraulic cylinder. Since the configuration of the catcher driving unit 28 is well known, a detailed description thereof will be omitted. The parts catcher 30 further includes a catcher body 32 and a base 34. The catcher body 32 has a pan-like shape and is configured to receive a product. The catcher body 32 is made of a plate material containing copper. Specifically, the surface of the catcher body 32 is made of a stainless steel material, and the inside of the catcher body 32 is made of a copper plate. Since copper is not easily melted by the laser, the durability of the catcher body 32 is maintained even when the catcher body 32 is brought close to the laser in order to support the projected workpiece PW.

Figure 5:
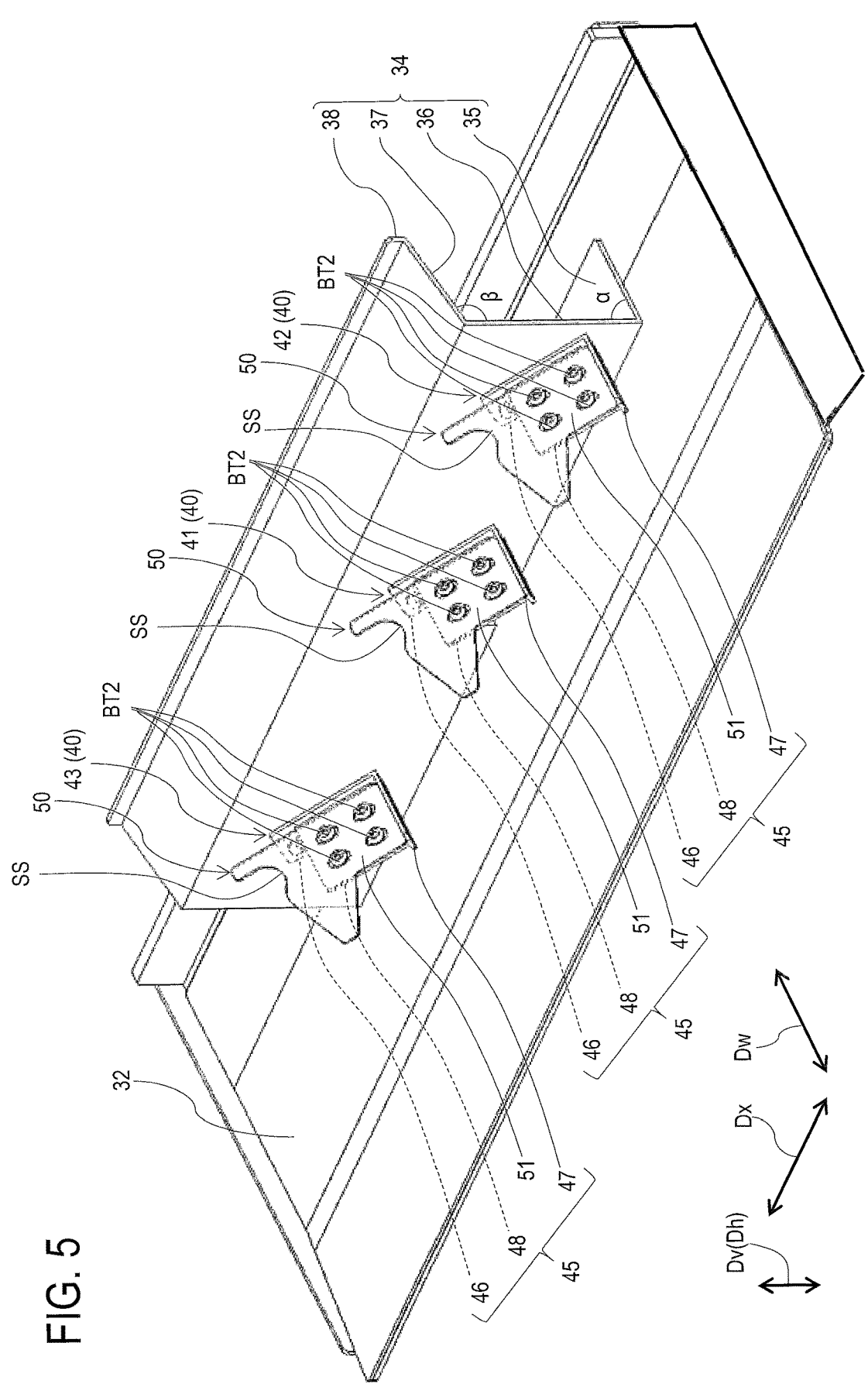
FIG. 5 is a perspective view of the parts catcher.

The base 34 is provided on the catcher body 32 and stands upright from the catcher body 32. FIG. 5 is a perspective view of the parts catcher 30. Referring to FIGS. 4 and 5, the base 34 includes a bottom wall 35, a side wall 36, a top wall 37, and a bank 38. The bottom wall 35 is connected to the catcher body 32. The side wall 36 connects the bottom wall 35 and the top wall 37. The top wall 37 faces the bottom wall 35 in the height direction Dh (vertical direction Dv). The bank 38 is provided on the top wall 37 on the side opposite to the portion connected to the side wall 36. An angle α formed by the side wall 36 and the bottom wall 35 is substantially a right angle. An angle β formed by the side wall 36 and the top wall 37 is an obtuse angle. The shape of the base 34 when the base 34 is viewed in the axial direction Dx is described later with reference to FIG. 10.

The catcher workpiece support 40 includes a support component 50 and an attachment 45. Referring to FIGS. 2, 4, and 5, the support component 50 is a replaceable plate-shaped member having a support surface SS corresponding to the side surface shape of the projected workpiece PW. The support component 50 is replaced with one that matches the shape of the workpiece W. In FIG. 5, a portion hidden by the support component 50 is indicated by a dotted line so that the shape of the attachment 45 can be understood. Referring to FIGS. 3 and 5, the attachment 45 is provided on the base 34 and the support component 50 can be attached to the attachment 45. More specifically, the attachment 45 includes a mounting portion 46, a guide 47, and a support portion 48. The mounting portion 46 of the attachment 45 is attached to the side wall 36 of the base 34 by a bolt BT1. Note that the attachment by a bolt BT1 is an example, and the attachment 45 may be attached to the base 34 by other methods such as welding or the like. The guide 47 is formed by an L-shaped steel. When attaching the support component 50 to the attachment 45, the support component 50 can be aligned by matching the corners of the support component 50 to the corners of the L-shaped steel. The support portion 48 is a plate-like member attached to the L-shaped steel, and has an attachment hole for attaching the support component 50 to the bolt BT2. A portion of the support component 50 that has the attachment hole and is in contact with the support portion 48 is referred to as an attaching part 51. Note that the attachment by the bolt BT2 is an example, and the attaching part 51 may be attached to the support portion 48 by other methods such as a hook. The support portion 48 supports the support component 50 when the support component 50 is attached to the attachment 45. As shown in FIG. 3, the support component 50 is inclined so as to approach the catcher body 32 as the support component approaches the chuck 12 in the axial direction Dx. This makes it easier for the projected workpiece PW to run onto the support surface SS of the support component 50.

Figure 6:
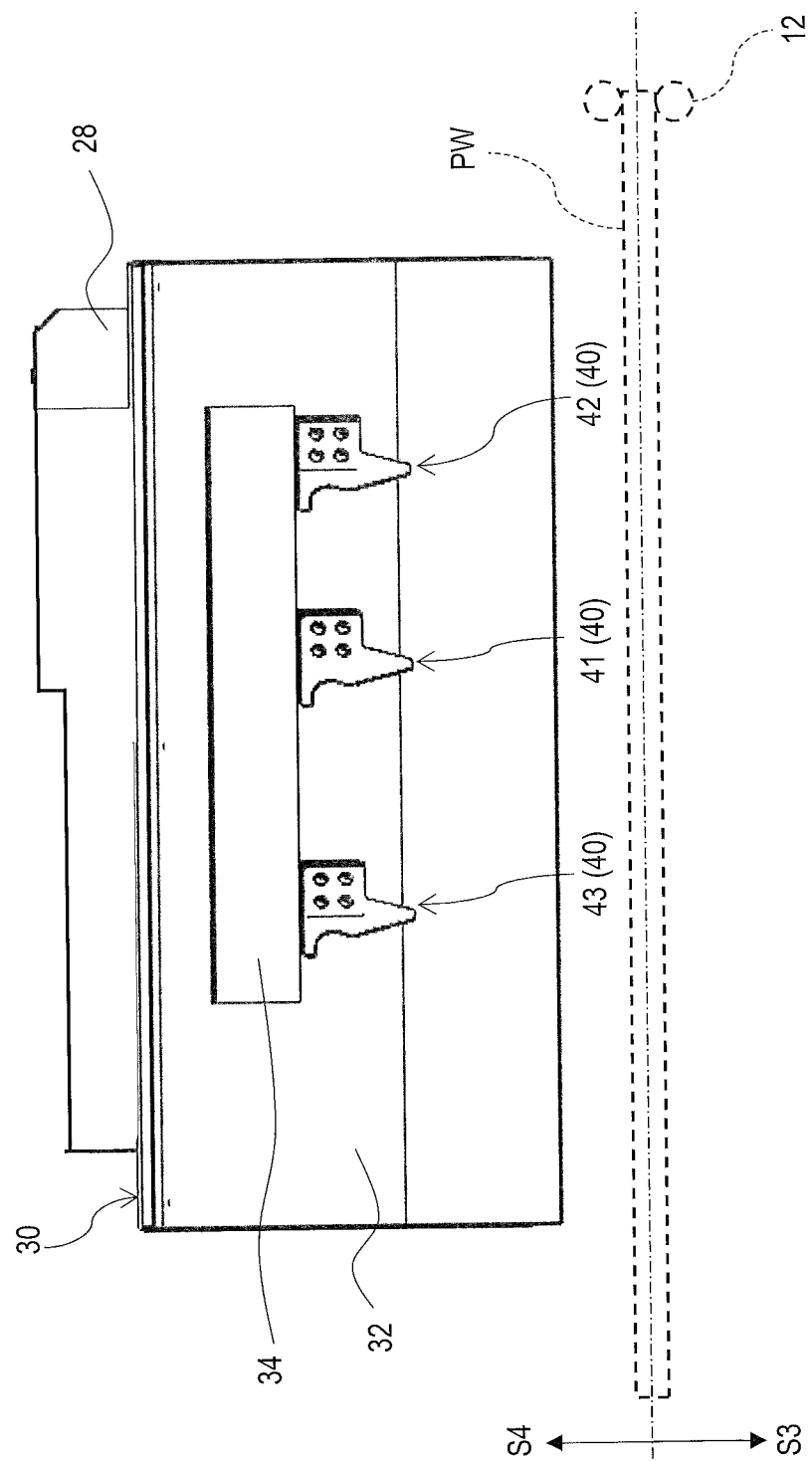
FIG. 6 is a top view of the parts catcher when the parts catcher is in the standby position.
Figure 7:
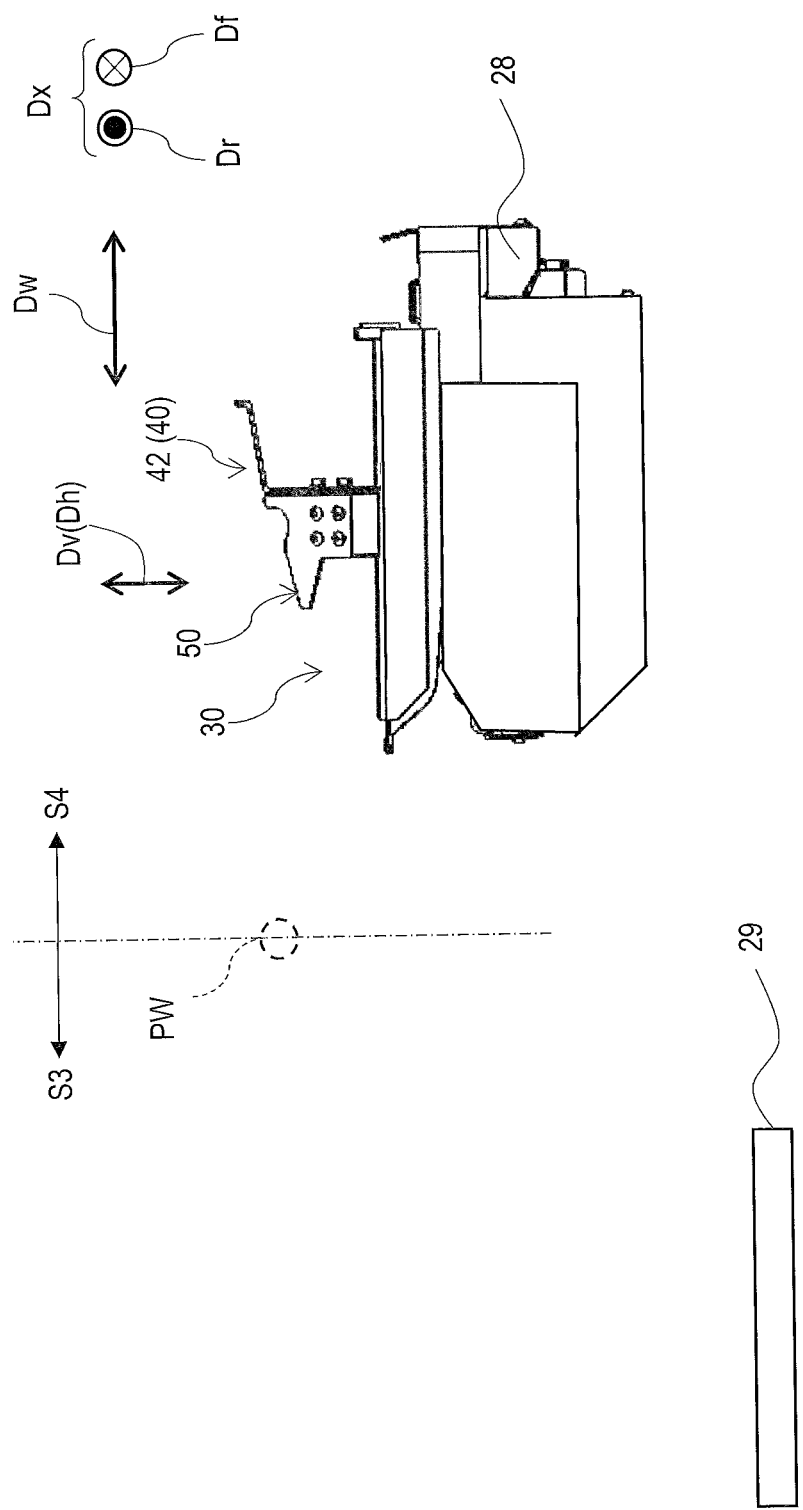
FIG. 7 is a right-side view of the parts catcher when the parts catcher is at the standby position.

When the projected workpiece PW is supported by the first workpiece support 16, the parts catcher 30 moves to the standby position. FIG. 6 is a top view of the parts catcher 30 when the parts catcher 30 is in the standby position. FIG. 7 is a right-side view of the parts catcher 30 when the parts catcher 30 is at the standby position. As shown in FIGS. 6 and 7, when the parts catcher 30 moves to the standby position, the parts catcher 30 does not overlap the projected workpiece PW in a top view. Therefore, in a case where the projected workpiece PW is supported by the first workpiece support 16, the parts catcher 30 does not interfere with the projected workpiece PW.

Figure 8:
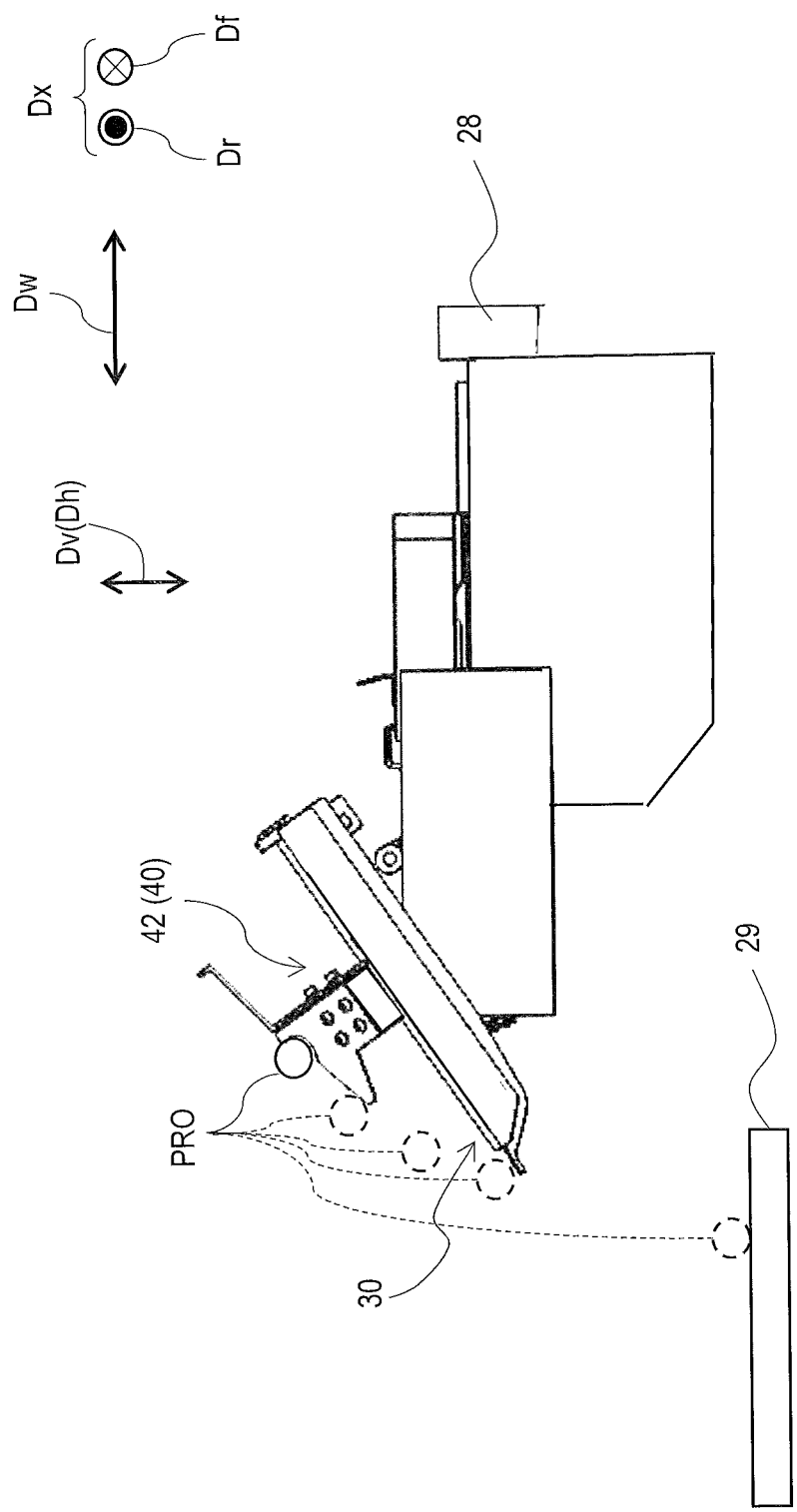
FIG. 8 is a right-side view of the parts catcher when the parts catcher is at the discharge position.

The parts catcher 30 is configured to convey the product PRO, which is the projected workpiece PW machined by the laser machining head 14, to the loading dock 29. The position of the parts catcher 30 when the product PRO is conveyed to the loading dock 29 is referred to as a discharge position. FIG. 8 is a right-side view of the parts catcher 30 when the parts catcher 30 is at the discharge position. Here, the posture taken by the parts catcher 30 in FIG. 4 or 7, that is, the posture in which the parts catcher 30 is in a case where the projected workpiece PW is supported by the first catcher workpiece support 41 is referred to as a first posture. In FIG. 8, the posture in which the parts catcher 30 is, that is, the second posture in which the parts catcher 30 is when the product PRO is discharged at the loading dock 29 is referred to as a second posture. As shown in FIGS. 4, 7, and 8, a posture of the parts catcher 30 is changeable from the first posture to the second posture.

Figure 9:
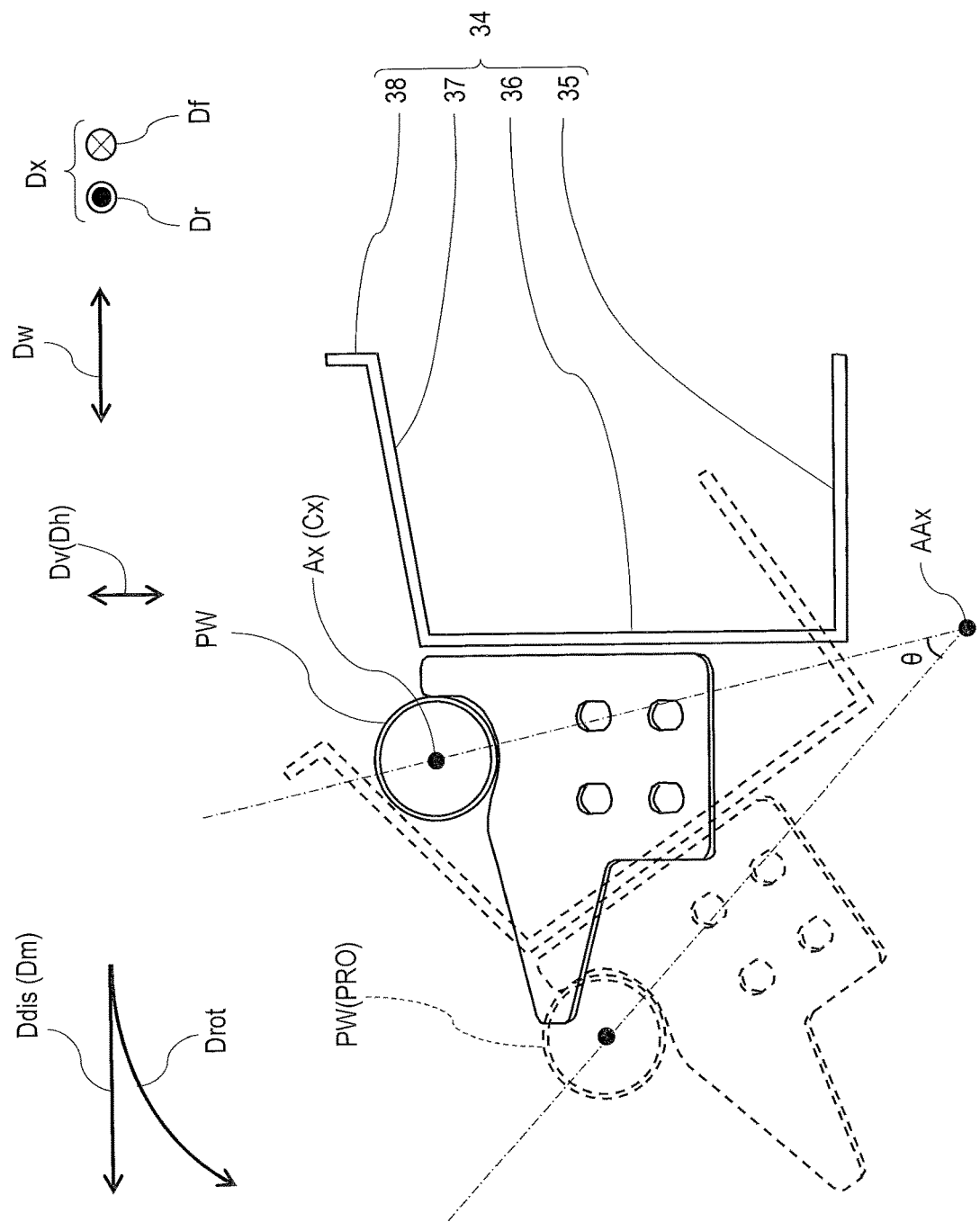
FIG. 9 is a view showing the base and the support component when the parts catcher takes the first posture, and the base and the support component when the parts catcher takes the second posture.
Figure 10:
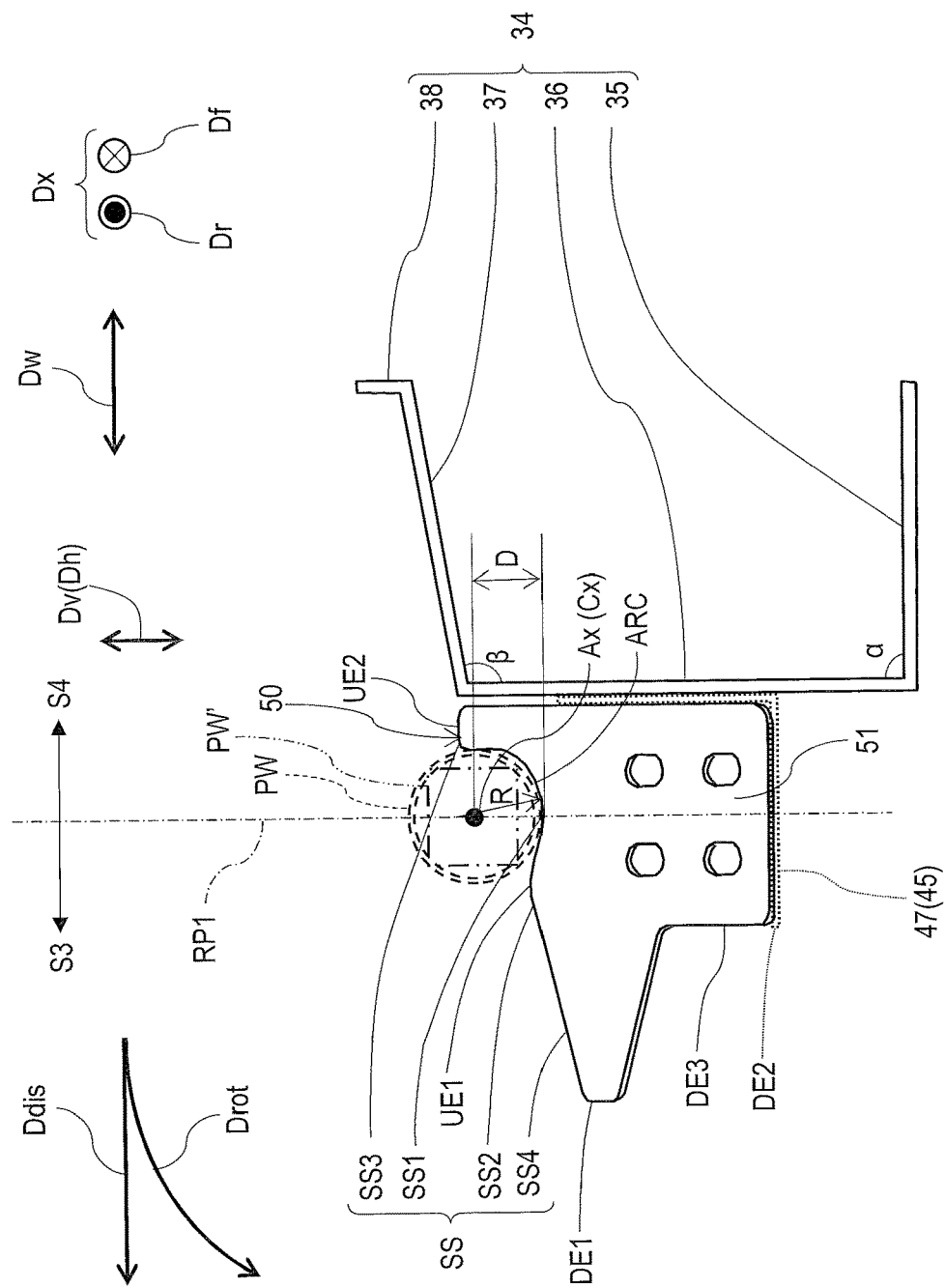
FIG. 10 is a diagram for explaining the shape of the support surface.

FIG. 9 is a diagram illustrating a relationship between a first posture and a second posture. FIG. 9 shows only the base 34 and the support component 50 of the parts catcher 30, and the base 34 and the support component 50 in the first posture are shown by solid lines, and the base 34 and the support component 50 in the second posture are shown by dotted lines. Referring to FIG. 9, the second posture is a posture obtained by rotating the first attitude about an additional rotational axis Ax substantially parallel to the rotational axis Ax by a first acute angle θ. FIG. 10 is a view illustrating the base 34 and the support component 50 when the parts catcher 30 of FIG. 9 takes the first posture. Referring to FIG. 10, when the parts catcher 30 is in the first posture and supports the projected workpiece PW, the support surface SS viewed in the axial direction Dx includes a bottom portion SS1, a first ridge portion SS2, and a second ridge portion SS3.

The bottom portion SS1 intersects with a first reference plane RP1 that includes a central axis Cx of the projected workpiece PW substantially coincident with the rotational axis Ax and extends in the vertical direction Dv when the projected workpiece PW is machined by the laser machining head 14. The first ridge portion SS2 is provided on a third side S3 spreading from the first reference plane RP1 in the discharge direction Ddis along the rotation direction Drot of the first acute angle θ, and bulges upward from the bottom portion SS1 in the height direction Dh along the height of the laser machining apparatus 1. The discharge direction Ddis is along a movement direction Dm in which the parts catcher 30 moves from the standby position toward the machining position. The second ridge portion SS3 is provided on a fourth side S4 opposite to the third side S3 with respect to the first reference plane RP1, and bulges upward from the bottom portion SS1. When viewed in the axial direction Dx, the upper end UE1 of the first ridge portion SS2 in the height direction Dh is provided below the upper end UE2 of the second ridge portion SS3 in the height direction Dh. With such a configuration, not only is the projected workpiece PW correctly positioned in the width direction Dw by the first ridge portion SS2 and the second ridge portion SS3, but the first ridge portion SS2 does not interfere when the product PRO is discharged.

The upper end UE2 of the second ridge portion SS3 is located above the central axis Cx of the projected workpiece PW. Accordingly, when the product PRO is discharged, the second ridge portion SS3 presses the product PRO in the discharge direction Ddis, and thus the catcher workpiece support 40 facilitates the discharge of the product PRO. The base 34 is provided on the catcher body 32 such that the base 34 is positioned on the fourth side S4 when the parts catcher 30 is in the first posture and supports the projected workpiece PW. With this configuration, the catcher body 32 does not interfere with the discharge of the product PRO. As shown in FIGS. 6 and 7, since the standby position is located at the fourth side S4, the base 34 does not collide with the projected workpiece PW when the parts catcher 30 moves from the standby position toward the machining position.

The support surface SS has a first extending portion SS4 extending from the first ridge portion SS2 such that the first extending portion SS4 is inclined to the movement direction Dm and to a downward direction of the height direction Dh. More specifically, the first extending portion SS4 is formed such that the distal end DE1 of the first extending portion SS4 in the movement direction Dm is positioned further in the movement direction Dm than the distal end DE2 of the guide 47 (attachment 45) in the movement direction Dm and the distal end DE3 of the attaching part 51 in the movement direction Dm. With such a configuration, when the parts catcher 30 moves from the standby position toward the machining position, the projected workpiece PW easily rides on the support surface SS. Note that the first extending portion SS4 may be omitted.

When the support surface SS is viewed in the axial direction Dx, the curve representing the support surface SS includes an arc ARC passing through the bottom portion SS1. The curvature radius R of the arc ARC is greater than or equal to the distance D between the rotational axis Ax and the bottom portion SS1 when the projected workpiece PW is machined by the laser machining head 14. With such a configuration, the support surface SS can support the workpiece W having a round pipe shape. Even if the projected workpiece PW is the square bar PW' as indicated by the two-dot chain line in FIG. 10, when the maximum distance between the square bar PW' and the rotational axis Ax is the distance D, the square bar PW' can be processed while being rotated.

Figure 11:
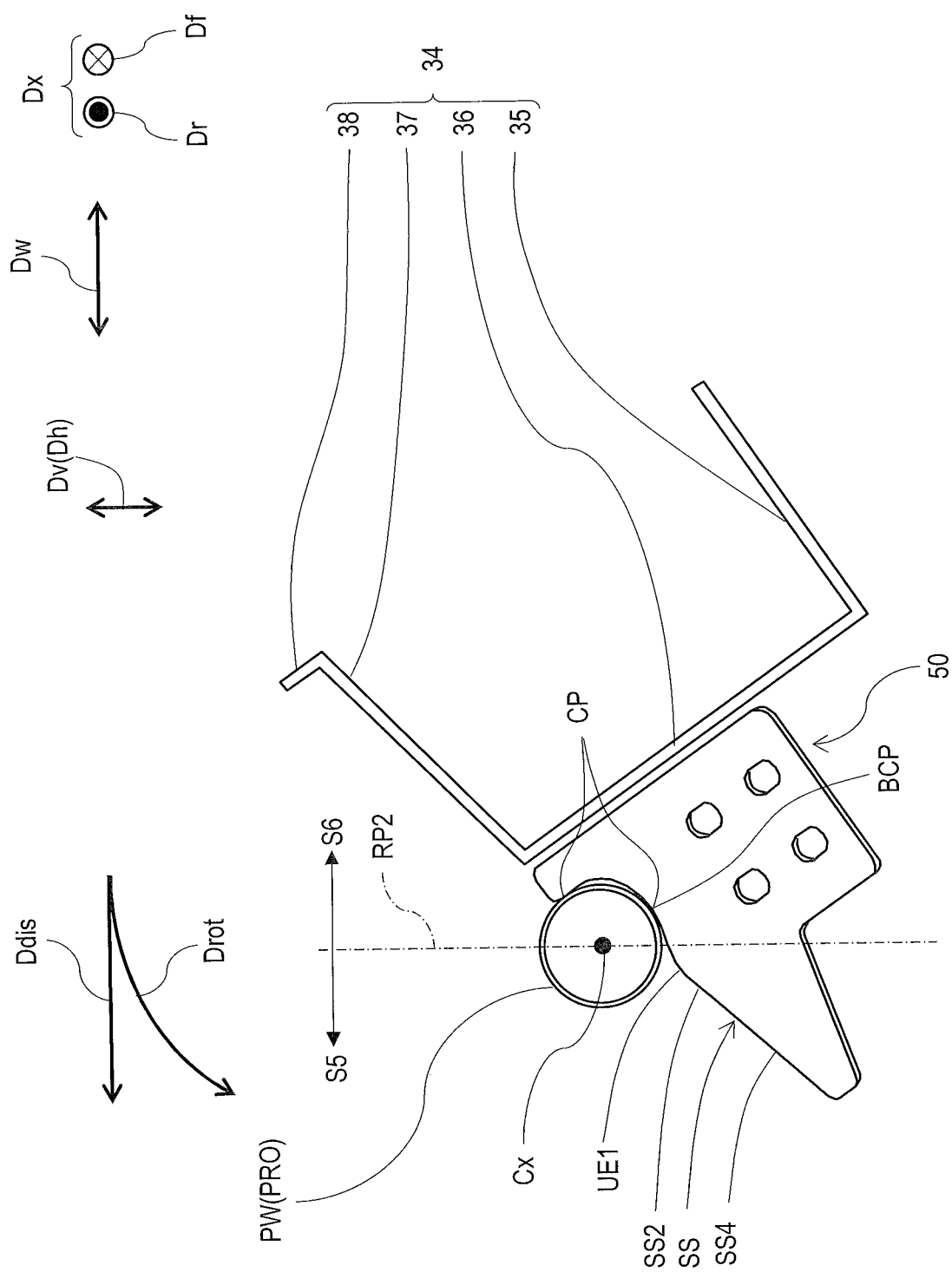
FIG. 11 is a view showing inclination of support surface of the support component when the parts catcher takes the second posture.

FIG. 11 is a view illustrating the base 34 and the support component 50 when the parts catcher 30 of FIG. 9 takes the second posture. Referring to FIG. 11, when the workpiece W is a round pipe material or a round bar material and the parts catcher 30 takes the second posture, the support surface SS is formed so as to satisfy the following conditions (1) to (3).
(1) The support surface SS contacts the projected workpiece PW (product PRO) at least one connection point CP.
(2) When viewed in the axial direction Dx, all of the at least one connection point CP is located on a sixth side S6 opposite to a fifth side S5 with respect to the second reference plane RP2, the fifth side S5 spreading from the second reference plane RP2 in the discharge direction Ddis, the second reference plane RP2 extending in the vertical direction Dv and includes the central axis Cx of the projected workpiece (product PRO).
(3) The support surface SS is inclined downward from the lowest point BCP of the at least one connection point CP as the support surface SS is separated from the lowest point BCP in the discharge direction Ddis. Since the support surface SS is formed as described above, the product PRO smoothly falls into the loading dock 29 when the parts catcher 30 is in the second posture.

Figure 12:
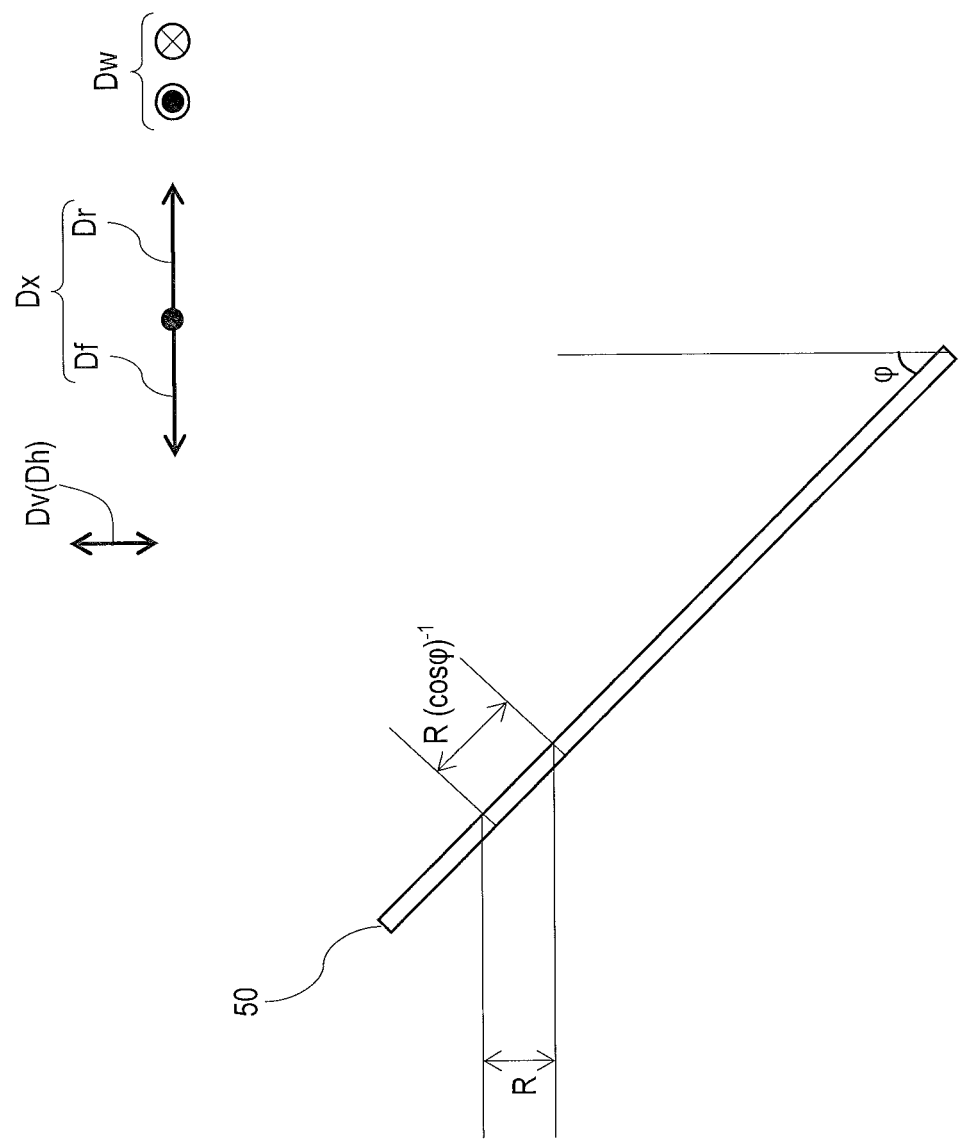
FIG. 12 is a side view schematically showing the support component.
Figure 13:
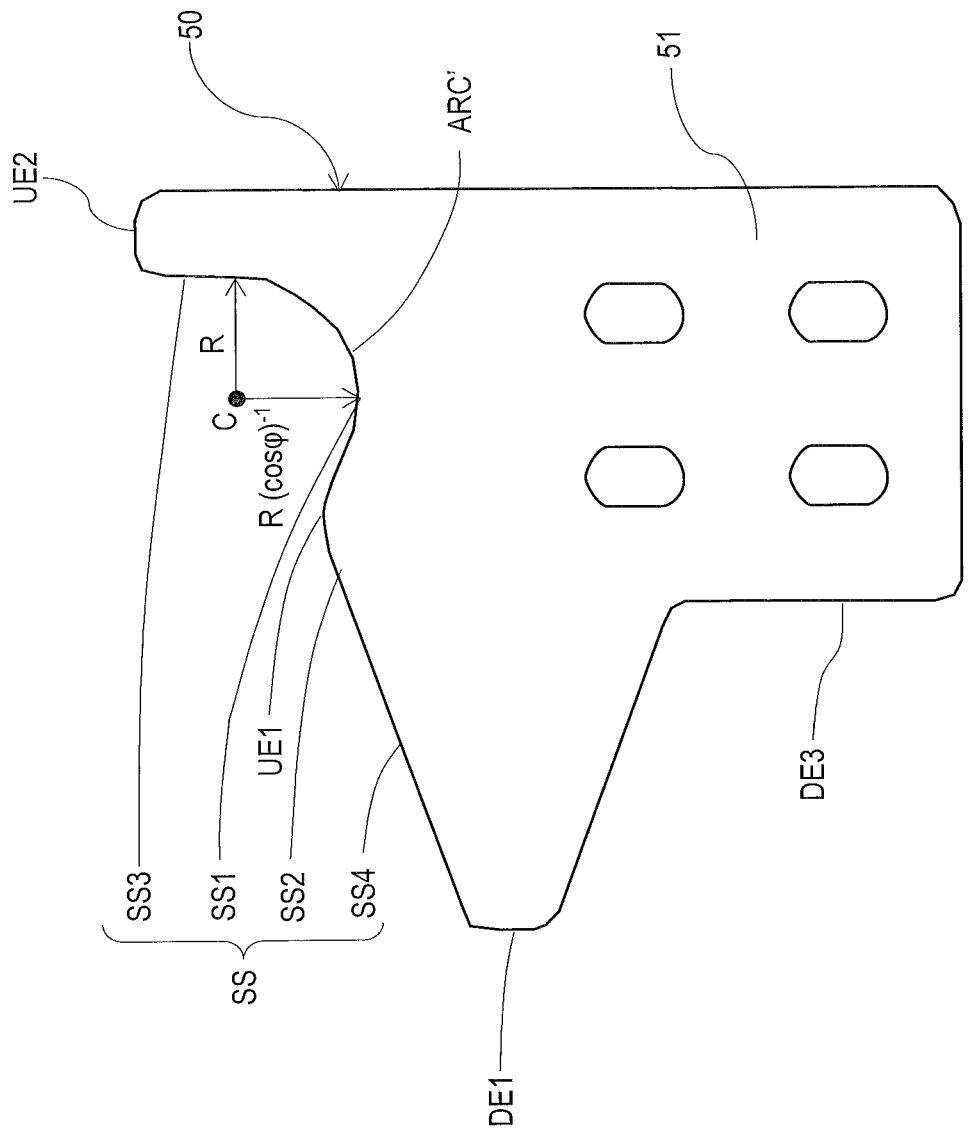
FIG. 13 is a plan view of the support component.

Next, the planar shape of the support component 50 will be described. As described above with reference to FIG. 3, the support component 50 is inclined so as to approach the catcher body 32 toward the chuck 12 in the axial direction Dx. FIG. 12 is a diagram schematically illustrating the support component 50 from the side. FIG. 13 is a plan view of the support component 50. As shown in FIG. 12, it is assumed that the support component 50 is inclined by an angle $\varphi$ with respect to the vertical direction Dv. At this time, when viewed from a direction perpendicular to the support component 50, the circular arc ARC having the radius of curvature R shown in FIG. 10 is stretched into an elliptical arc ARC' having a minor axis radius R and a major axis radius R $(\cos \varphi)^{-1}$ as shown in FIG. 13.

<Effect of the Embodiment>

In the method described in Japanese Patent No. 6,741,447, since the short workpiece is supported in a cantilever state by the chuck, there is a problem in that the workpiece is bent by its own weight, and thus it is difficult to perform highly accurate machining. In particular, there has been a problem that accuracy is lowered due to the influence of deflection in oblique machining in which a workpiece is machined in a state where the laser machining head is obliquely inclined.

In the laser machining apparatus 1 of the present embodiment, the parts catcher 30 includes the first catcher workpiece support 41 (catcher workpiece support 40) in addition to the first workpiece support 16. Since the projected workpiece PW of the workpiece W, which is short, is supported by the first catcher workpiece support 41 (catcher workpiece support 40), the projected workpiece PW can be accurately machined.

(Modification)

Figure 15:
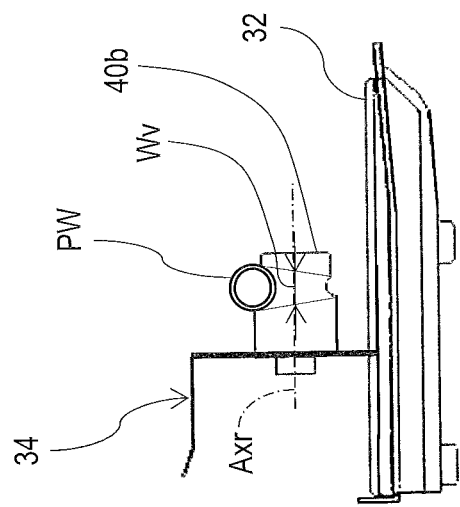
FIG. 15 shows a second modification of the catcher workpiece support.
Figure 14:
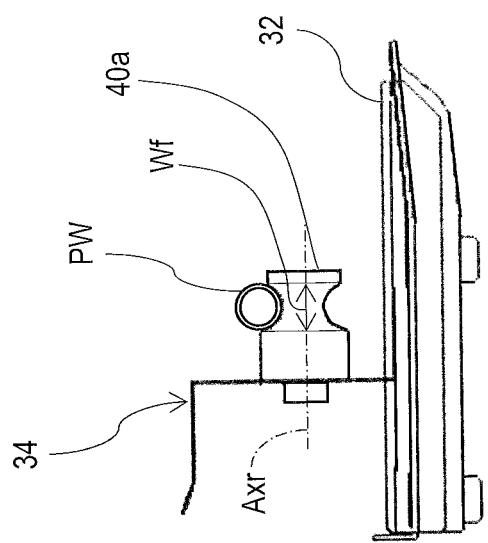
FIG. 14 shows a first modification of the catcher workpiece support.

The catcher workpiece support 40 is not limited to the above-described con figuration. FIGS. 14 and 15 show modifications of the catcher workpiece support 40.

FIG. 14 shows the catcher workpiece support 40a realized by rollers. In the catcher workpiece support 40a, the width Wf of the groove supporting the projected workpiece PW is uniform around the rotational axis Axr. FIG. 15 shows the catcher work piece support 40b realized by a special roller which changes the width Wv of the groove supporting the projected workpiece PW when rotated around the rotational axis Axr. The roller shown in FIG. 15 can be adjusted to the width Wv of the groove corresponding to the shape of the projected workpiece PW to be supported. Both the catcher workpiece support 40a and the catcher workpiece support 40b provide the same effects as those of the above embodiment.

In this application, "comprise" and its derivatives are open-ended terms that specify the presence of stated elements but do not preclude the presence of other unstated elements. This also applies to "having", "including" and their derivatives.

The phrases "member", "part", "element", "body" and ""structure" may have a plurality of meanings such as a single portion or a plurality of portions.

Ordinal numbers such as "first" and "second" are merely terms for identifying structures and do not have other meanings (e.g., a specific order). For example, the presence of a "first element" does not imply the presence of a "second element", and the presence of a "second element" does not imply the presence of a "first element".

Words such as "substantially," "about," and "approximately," which represent degrees, can mean a reasonable amount of deviation such that the end result is not significantly changed, unless the embodiment is specifically described. All numerical values recited herein can be interpreted to include such terms as "substantially," "about," and "approximately."

The phrase "at least one of A and B" in this application should be interpreted to include only A, only B, and both A and B.

Obviously, many modifications and variations of the present invention are possible in light of the above teachings. It is therefore to be understood that within the scope of the appended claims, the invention may be practiced otherwise than as specifically described herein.

What is claimed is:
1. A laser machining apparatus comprising:
  a chuck configured to hold a workpiece such that the workpiece is rotatable about a rotational axis;
  a first workpiece support provided on a first side with respect to the chuck in an axial direction along the rotational axis to support a projected workpiece of the workpiece projected from the chuck on the first side;
  a second workpiece support provided between the first workpiece support and the chuck in the axial direction to support the projected workpiece on the first side;

a laser machining head provided on the first side and configured to machine the projected workpiece with a laser beam to produce a product; and a parts catcher configured to receive the product in a case where the projected workpiece is not supported by the first workpiece support, the parts catcher being configured to transfer the product to a loading dock and comprising:

a catcher body having a pan-like shape and being rotatable about an additional rotational axis; and a first catcher workpiece support supported by the catcher body and configured to support the projected workpiece when the projected workpiece is machined by the laser machining head, the catcher body being configured to receive the product, a first distance between the first catcher workpiece support and the chuck in the axial direction being shorter than a second distance between the first workpiece support and the chuck in the axial direction.

2. The laser machining apparatus according to claim 1, wherein the parts catcher further comprises a second catcher workpiece support provided on the catcher body between the first catcher workpiece support and the chuck in the axial direction to support the projected workpiece when the projected workpiece is machined by the laser machining head.

3. The laser machining apparatus according to claim 1, wherein the parts catcher configured to move to a machining position in a case where the projected workpiece is supported by the first catcher workpiece support, and move to a standby position so as not to interfere with the projected workpiece by the first catcher workpiece support in a case where the projected workpiece is supported by the first workpiece support.

4. The laser machining apparatus according to claim 2, wherein the parts catcher further comprises:

a base provided on the catcher body to stand upright from the catcher body, and wherein each of the first catcher workpiece support and the second catcher workpiece support includes:

a support component which is replaceable and has a support surface corresponding to a side surface shape of the projected workpiece; and an attachment that is provided on the base and to which the support component is attachable.

5. The laser machining apparatus according to claim 4, wherein the support component is a plate-shaped component and is inclined so as to approach the catcher body as the support component approaches the chuck in the axial direction.

6. The laser machining apparatus according to claim 5, wherein a posture of the parts catcher is changeable from a first posture in which the parts catcher is when the projected workpiece is supported by the first catcher workpiece support to a second posture in which the parts catcher is when the product is discharged at the loading dock, wherein the second posture is a posture obtained by rotating about the additional rotational axis by a first acute angle with respect to the first posture, and wherein, when the part catcher is in the first posture and supports the projected workpiece, the support surface viewed in the axial direction includes:

a bottom portion intersecting with a first reference plane that extends in a vertical direction and includes a central axis of the projected workpiece which is coaxial with the rotational axis of the projected workpiece when the projected workpiece is machined by the laser machining head;

a first ridge portion provided on a third side spreading from the first reference plane in a discharge direction along the rotation direction of the first acute angle, the first ridge portion bulging upward from the bottom portion in a height direction along a height of the laser machining apparatus; and a second ridge portion provided on a fourth side opposite to the third side with respect to the first reference plane, the second ridge portion bulging upward from the bottom portion, and wherein an upper end of the first ridge portion in the height direction is provided below an upper end of the second ridge portion in the height direction.

7. The laser machining apparatus according to claim 6, wherein the upper end of the second ridge portion is located above the central axis of the projected workpiece.

8. The laser machining apparatus according to claim 6, wherein, when the support surface is viewed in the axial direction, a curve representing the support surface includes an arc passing through the bottom portion, and a curvature radius of the arc is equal to or larger than a distance between the rotational axis and the bottom portion when the projected workpiece is machined by the laser machining head.

9. The laser machining apparatus according to claim 6, wherein the support surface is formed such that the support surface contacts the projected workpiece at at least one connection point and the support surface is inclined downward from a lowermost point of the at least one connection point as the support surface is separated from the lowermost point in the discharge direction when the parts catcher is in the second posture, all of the at least one connection point being located on a sixth side opposite to a fifth side with respect to a second reference plane when viewed in the axial direction, the second reference plane passing through the central axis of the projected workpiece and extending in the vertical direction, the fifth side spreading from the second reference plane in the discharge direction.

10. The laser machining apparatus according to claim 6, wherein the base includes a bottom wall connected to the catcher body, a top wall facing the bottom wall in the height direction when the parts catcher is in the first posture, and a side wall connecting the bottom wall and the top wall, and wherein an angle formed by the side wall and the bottom wall is a right angle, and an angle formed by the side wall and the top wall is an obtuse angle.

11. The laser machining apparatus according to claim 10, wherein the base further includes a bank provided on an opposite side of a portion connected to the side wall on the top wall.

12. The laser machining apparatus according to claim 4, wherein the catcher body is made of a plate material containing copper.

13. The laser machining apparatus according to claim 1, wherein the laser machining head is orientable to a direction inclined from a vertical direction toward the axial direction.

14. The laser machining apparatus according to claim 2, wherein a third distance between the second catcher workpiece support and the chuck in the axial direction is shorter than a fourth distance between the second workpiece support and the chuck in the axial direction.

15. The laser machining apparatus according to claim 1, wherein the first workpiece support and the second workpiece support are rollers.

16. The laser machining apparatus according to claim 1, wherein the workpiece is held by the chuck such that the workpiece passes through the chuck.

17. The laser machining apparatus according to claim 16, wherein an additional chuck provided on a second side opposite to the first side with respect to the chuck, configured to support the workpiece rotatably around the rotational axis, and configured to move in the axial direction.

18. The laser machining apparatus according to claim 6,
wherein the parts catcher configured to move to a standby position located on the fourth side so as not to interfere with the projected workpiece by the first catcher workpiece support when the projected workpiece is supported by the first workpiece support, and move to a machining position when the projected workpiece is supported by the first catcher workpiece support, and
wherein a movement direction from the standby position toward the machining position is along the discharge direction.

19. The laser machining apparatus according to claim 18,
wherein the base is provided on the catcher body such that the base is positioned on the fourth side when the parts catcher is in the first posture and supports the projected workpiece, and
wherein the support component includes a first extending portion that extends from the first ridge portion such that the first extending portion is inclined to the movement direction and to a downward direction of the height direction when the projected workpiece is supported by the first catcher workpiece support.

20. The laser machining apparatus according to claim 1, wherein the catcher body is movable in a width direction perpendicular to the axial direction.

21. The laser machining apparatus according to claim 1, wherein the catcher body is rotatable about the additional rotational axis that is parallel to the rotational axis.

* * * * *